UNITED STATES PATENT OFFICE.

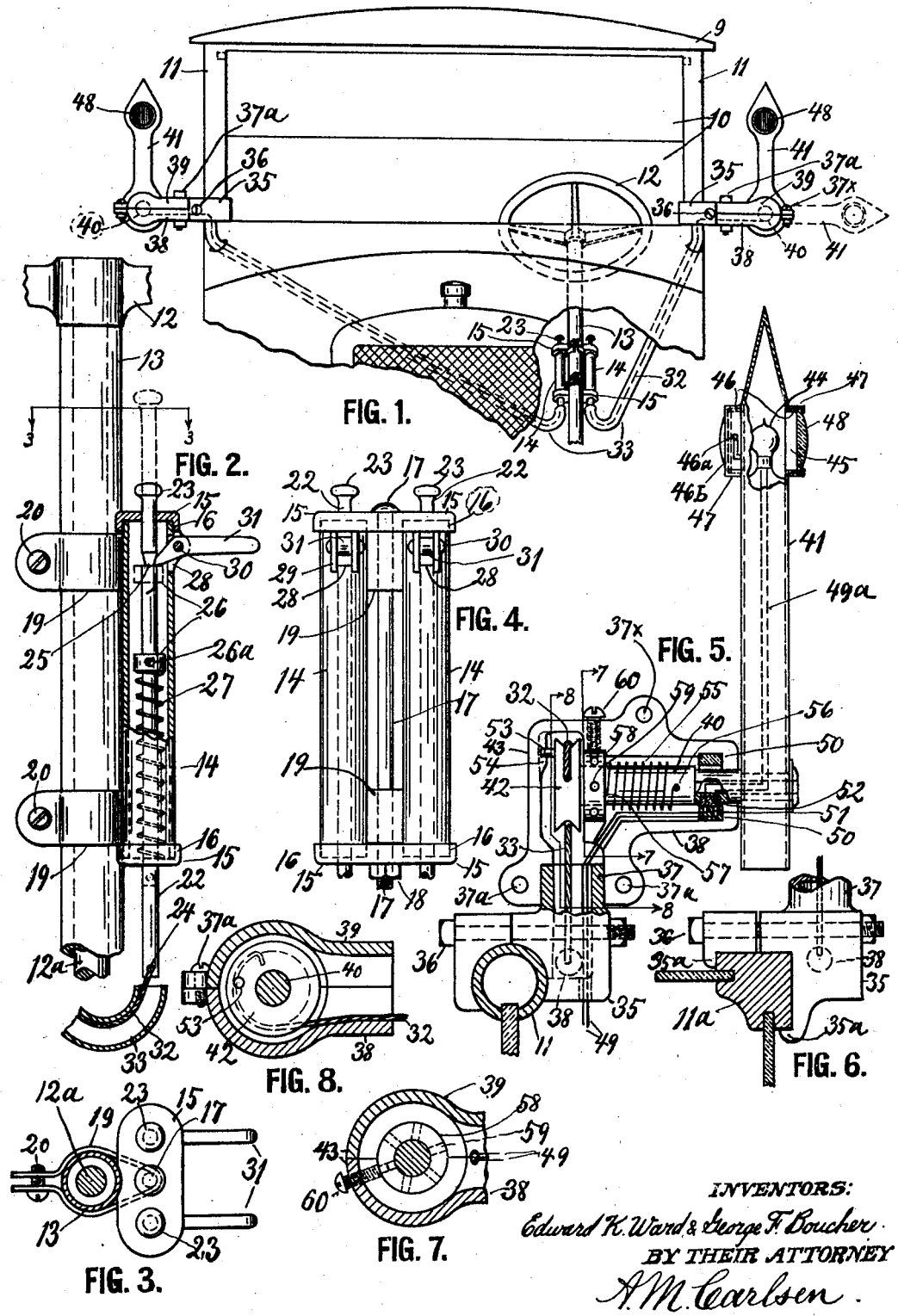

EDWARD K. WARD AND GEORGE F. BOUCHER, OF ST. PAUL, MINNESOTA.

AUTOMOBILE DIRECTION SIGNAL.

1,405,699.  Specification of Letters Patent.  Patented Feb. 7, 1922.

Application filed December 11, 1920. Serial No. 430,047.

*To all whom it may concern:*

Be it known that we, EDWARD K. WARD and GEORGE F. BOUCHER, citizens of the United States, residing at St. Paul, in the county of Ramsey and State of Minnesota, have invented a new and useful Automobile Direction Signal, of which the following is a specification.

Our invention relates to direction signals for all classes of vehicles, particularly automobiles; and the general object is to provide a device of said class which is absolutely reliable in action, easily operated and particularly adapted to be fitted on any type of automobile or truck.

The above object we attain by the construction illustrated in the accompanying drawing, in which,—

Fig. 1 is a front elevation of an automobile equipped with our device, parts of the automobile being omitted. Fig. 2 is a partly sectional side elevation of the working parts of the device mounted on the steering column of an automobile. Fig. 3 is a section on the line 3—3 of Fig. 2. Fig. 4 is a right hand side elevation of Fig. 2, with the steering column omitted. Fig. 5 is a partly sectional top view of one of the pointing arms or arrows and its operating parts, some minor parts being omitted. Fig. 6 is a modification of the lower portion of Fig. 5. Fig. 7 is a sectional view on the line 7—7 in Fig. 5. Fig. 8 is a sectional view on the line 8—8 in Fig. 5.

Referring to the drawing by reference numerals, 9 designates an automobile of the passenger car type having wind shields 10, front corner posts 11, steering wheel 12, shaft 12$^a$ and its column 13.

Our device consists mainly of a spring actuated operating mechanism or device mounted preferably on the steering columns near the driver, and two signal devices mounted one near each front corner of the car body and operated from the operating device.

The operating device has a light frame composed of two spaced plates 15 having sockets 16 for the ends of two tubes 14, a bolt 17 with nut 18 holds the plates firmly against the ends of the tubes. This frame is detachably secured on the steering column 13 by two clips 19 embracing the rod 17 and having bolts 20 clamping them to the steering tube.

Each tube 14 has a rod 22 passed centrally through it and the plates 15. Said rods always project through the plates 15 and have their upper ends provided with heads 23 and the lower ends with holes 24; and the upper portion of each rod has an annular recess forming a shoulder 25. It also has a collar 26 held by a screw 26$^a$; a compression spring 27 encircling the rod between said collar and the lower plate 15 so as to give the rod an upward tendency at all times. Near the upper end of each tube is a slot 28 and lugs 29 with a pivot 30 through them, on which is supported a dog-lever 31, the inner end of which is adapted to engage the shoulder 25 of rod 22. Each rod is operatively connected with one of the signal devices by a cord or wire 32 secured in the hole 24 in the lower end of the rod, and said cords 32 are guided through tubular conduits 33 or equivalent means, to the signal devices which will now be described, said devices being counterparts of each other we will describe only one of them.

Each signal device comprises a clamp 35 having its two members drawn tight preferably about one of the corner posts 11 of the car or its windshield by a bolt 36, as shown in Fig. 5, where the post 11 is of the cylindrical type. If the post is angular or of a form similar to that in Fig. 6, the form of the clamp is modified accordingly, even by giving it lips 35$^a$ where so required. In either case the main jaw of the clamp has a tubular extension 37 adapted to be inserted and clamped by screws 37$^a$ between the lower and upper members, 38, 39, of a combined journal box and mechanism chamber. In said box is journaled a partly hollow shaft 40, whose outer end carries a hollow arrow or indicator arm 41 and the inner end a fixed pulley 42 to which is attached one end of the cable or wire 32 which extends to the hole 24 in the sliding rod 22.

In each signal arm 41 is an electric light bulb 44 mounted between the two openings 45, each of which has a rim 46 with two opposite studs 46$^a$ adapted to engage in notches 46$^b$ of a ring 47 in which a colored lens 48 is secured (see Fig. 5), so that when the bulb is lighted the signal arm gives out a colored light. Current for the light is wired from a battery or other source (not shown) through wires 49 into a non-conductive collar 50 having metal contacts 51 registering with ends of wires 49ª in a plug 52 fixed in shaft 40 when the signal arm is horizontal (see Fig. 5), at which time only the circuit is closed and the light is on. When indicator arrow is returned to vertical position the contact at 52 is broken and the light does not show. A pin 53 in pulley 42 engages a shoulder 54 in housing 43 when the arrow is turned to horizontal position; a similar shoulder (not shown) stops pin 53 when the indicator is raised upward.

To bring the indicator to its normal or vertical position we provide a torsion spring 55 on shaft 40 with one end fixed to the shaft as at 56 and the other end fixed at 57 in a collar 58, which collar incidentally is the inner bearing of the shaft 40. Said collar has a series of holes 59 (in its periphery) in which a nail may be inserted and the collar turned to regulate the tension of spring 55. A screw 60 with its end pointed to fit any of holes 59 in collar 58 will hold the latter locked and the spring in any tension required.

The signal arms may be arranged either rearward of their supports 38—39 as in Fig. 1 or forward thereof as in Fig. 5.

The device is operated as follows:

Assuming that parts shown in full lines in Figs. 1 and 2 are in readiness for operation and that the driver of the automobile wishes to indicate that he is about to turn the car to his left,—

First, the driver pulls left hand lever 31 upward thus disengaging it from recess 25 in rod 22. Spring 27 then instantly forces rod 22 upwardly until collar 26 is stopped by lever 31 as at 26 (dotted in Fig. 2) thus the left side rod 22 pulls cord 32 turning pulley 42, shaft 40 and arrows 41 one fourth of a turn which turns the arrow to the horizontal position shown in dotted line in Fig. 1 and full line in Fig. 5. At this stage the electric circuit is closed, instantly displaying a colored light in the extended arm on left side of the driver and indicating to other drivers and pedestrians that he is about to turn the automobile to the left. When the driver has made the turn and the indicator is no longer needed, he merely presses down on the button 23 of rod 22, until the lever 31 by its weight again engages the shoulder 25. This action releases cord 32 from the tension caused by spring 27, but the weaker spring 55 in the signal arm shaft 40 is strong enough to take up the slack in the cord and return the arrow to vertical position. This operation is just the same for the right hand side signal arm and the right hand press button 23.

Besides the screws or bolts 37ª, the parts or journal members 38, 39 may be further secured together by one or more screws 37ˣ.

If the supporting post 11 or 11ª are of different forms the remedy is simply to use a clamp 35 to fit it, since the part 37 of either clamp will fit into the adjacent part of the journal box 38—39 so as to be clamped therein by the screws 37ª.

What we claim is:

1. In an automobile direction signal device, the combination with the steering shaft column, of a frame secured thereto and having two vertically slidable operating rods, each with a press button at its top, a spring on each rod arranged to slide the rod upward, means on each rod for a catch to engage, a pivoted dog near each rod arranged to automatically engage said means and hold the rod depressed, a guided flexible element extended from the lower end of each operating rod, a signal arm pivotally mounted near each front corner of the vehicle and having a horizontal rock shaft with a pulley fixed on it and operatively connected with one of said flexible elements so as to be turned with the signal arm to a horizontal lateral position by the spring acting on the operating rod, and a weaker torsion spring arranged upon the rock shaft to turn the signal arm to a vertical position when the spring at the push rod ceases to act after the corresponding rod has been released from the dog.

2. The structure specified in claim 1 and means for regulating the tension of the weaker spring.

3. In a vehicle direction signal, the combination with a movable indicator arm, of means for mounting the same on a vehicle, said means consisting of a clamp adapted to be secured upon a vertical post of the vehicle, and having a hollow extension a split journal box having screws for clamping it with one end about said extension, a shaft journaled in the box at right angles to the hollow extension, a pulley fixed on the inner end of said shaft, a cord extending from the pulley and adapted to turn it in a certain direction, means for limiting said turning, a torsion spring about the shaft arranged to rotate it in the reverse direction and means for limiting the action of the latter spring.

In testimony whereof we affix our signatures.

EDWARD K. WARD.
GEO. F. BOUCHER.